UNITED STATES PATENT OFFICE.

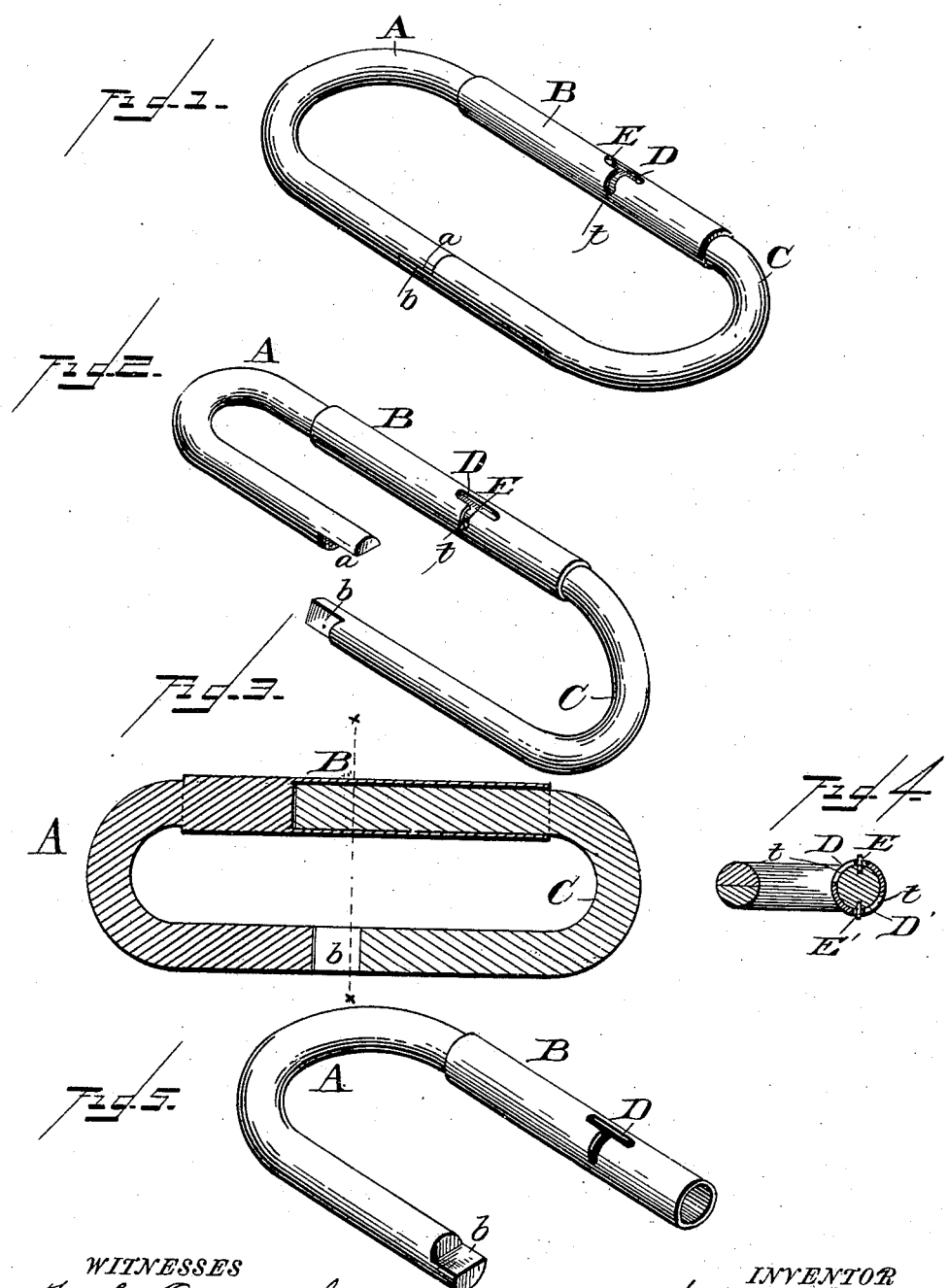

ANDREW T. FOSTER, OF BELLE UNION, INDIANA, ASSIGNOR OF ONE-HALF TO ALBERT COX, OF SAME PLACE.

LAP-RING.

SPECIFICATION forming part of Letters Patent No. 407,584, dated July 23, 1889.

Application filed January 19, 1889. Serial No. 296,894. (No model.)

*To all whom it may concern:*

Be it known that I, ANDREW T. FOSTER, a citizen of the United States, and a resident of Belle Union, in the county of Putnam and State of Indiana, have invented certain new and useful Improvements in Lap-Rings; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved lap-ring. Fig. 2 is a similar view showing the device open. Fig. 3 is a longitudinal sectional view of the device. Fig. 4 is a cross-section on the line $x$ $x$ of Fig. 3; and Fig. 5 is a perspective detail view of the hook and sleeve, which forms a part of the device.

Like letters of reference denote corresponding parts in the several figures.

My invention has relation to that class of devices known technically as "lap-rings," adapted to connect removably the singletrees to the doubletree of a vehicle, the clevis to a plow-tongue, and for all similar purposes; and my improvement consists in the detail construction and combination of parts of a device of that class, whereby the same may be manufactured at a very small cost, while at the same time it shall be very durable and efficient and without liability to break or become accidentally detached.

By reference to the accompanying drawings it will be seen that my improved lap-ring consists, essentially, of two parts—viz., the hook A, having one end formed into a sleeve B, and the removable hook C. If desired, however, the sleeve B may be made removable, thus making three parts in all; but for purposes of convenience I prefer to construct the device in two parts or pieces, as illustrated in the drawings.

The hook A is either inserted into and firmly secured to or is made integral with the sleeve B, the projecting tubular part of which is provided with two T-shaped slots or recesses, (designated by the letters D and D'.) The hook C is inserted loosely into this part of the sleeve, so that it may readily be moved forward and back, and also turn in the sleeve, and that part which is inserted into and works in the sleeve is provided with two projections E and E', registering with and projecting through the T-shaped slots D and D', respectively. The projecting prongs or hooks are flattened at their outer ends, as shown at $a$ and $b$, so that when the hook is closed or locked these flattened ends will bear against each other, thereby forming a smooth and even exterior.

From the foregoing description, taken in connection with the drawings, the operation of my device will be readily understood. When it is desired to unlock or open the ring, the movable hook C is pushed into the sleeve B until its projections register with the stem $t$ of the T-shaped slots D and D', when by giving the hook a turn to one side the projections will enter these slots, thereby permitting the hook to be opened. After it has been applied in its proper place, it is again closed and locked simply by turning the part C back into its normal position until the flattened ends $a$ and $b$ impinge upon each other, when by giving a slight pull on the part C it is drawn back in the sleeve, so as to cause its projections E and E' to enter the horizontal parts U U of the slots, in which position the ring cannot be unlocked.

Having thus fully described my invention, I claim and desire to secure by Letters Patent of the United States—

In a lap-ring, the combination of the hooked part A, having the sleeve thereon, provided with a T-shaped slot, and a hooked part C, movably inserted into the said sleeve and having projections adapted to engage the said T-shaped slot to lock the two parts together, the parts A and C having overlapping ends $a$ $b$, substantially as described.

In testimony that I claim the foregoing as my own I have hereunto affixed my signature in the presence of two witnesses.

ANDREW T. FOSTER.

Witnesses:
WINFIELD S. COX,
JOHN M. NEWNAM.